United States Patent [19]

Ackley, Sr. et al.

[11] 4,372,437

[45] Feb. 8, 1983

[54] GAUGING ASSEMBLY FOR CAPSULE ORIENTING AND TURNING APPARATUS

[75] Inventors: Charles E. Ackley, Sr., Oreland; Charles E. Ackley, Jr., Philadelphia, both of Pa.

[73] Assignee: R. W. Hartnett Company, Philadelphia, Pa.

[21] Appl. No.: 137,850

[22] Filed: Apr. 7, 1980

[51] Int. Cl.³ .............................................. B65G 47/24
[52] U.S. Cl. ..................................... 198/380; 101/40; 198/384
[58] Field of Search ............... 198/380, 384, 393, 397, 198/400, 390, 389, 416, 836; 221/156, 171, 173; 209/686, 684; 101/40

[56] References Cited

U.S. PATENT DOCUMENTS 3,001,636 9/1961 Klapes .............................. 198/836
4,104,966 8/1978 Ackley et al. .................. 198/380 X

*Primary Examiner*—John J. Love
*Assistant Examiner*—Douglas D. Watts
*Attorney, Agent, or Firm*—Austin R. Miller

[57] ABSTRACT

An improved gauging assembly for a capsule orienting and turning apparatus is disclosed. Many capsules are picked up in a rotary conveyor which arranges them first in an upright arrangement relative to the path of movement of the conveyor, some capsules arranged caps-up and some bodies-up. The gauging assembly cooperates with air means to tilt the body portions of the bodies-up capsules in the machine direction while retaining the caps-up capsules substantially untilted so that all the cap portions can subsequently be shifted in a sidewise direction by a subsequent sideward-directed air suction means. Those capsules which are arranged caps-up are not affected by the first means because of the gauging block which prevents substantial tilting movement; the cap portions of these capsules are then drawn sidewise by a sidewardly-directed vacuum. The gauging assembly defines a passageway extending in the direction of conveyor movement and comprises a ceiling member and contiguous sidewall member. One side of the passageway is defined by edge portions of the longitudinally oriented pocket portions which are provided in the rotary conveyor. The ceiling member and contiguous sidewall are mounted on a slidable bar which is disposed transversely with respect to the rotary conveyor. The bar may be slid back and forth transversely across the conveyor so as to adjust the width of the passageway to more easily accommodate different capsule sizes.

7 Claims, 20 Drawing Figures

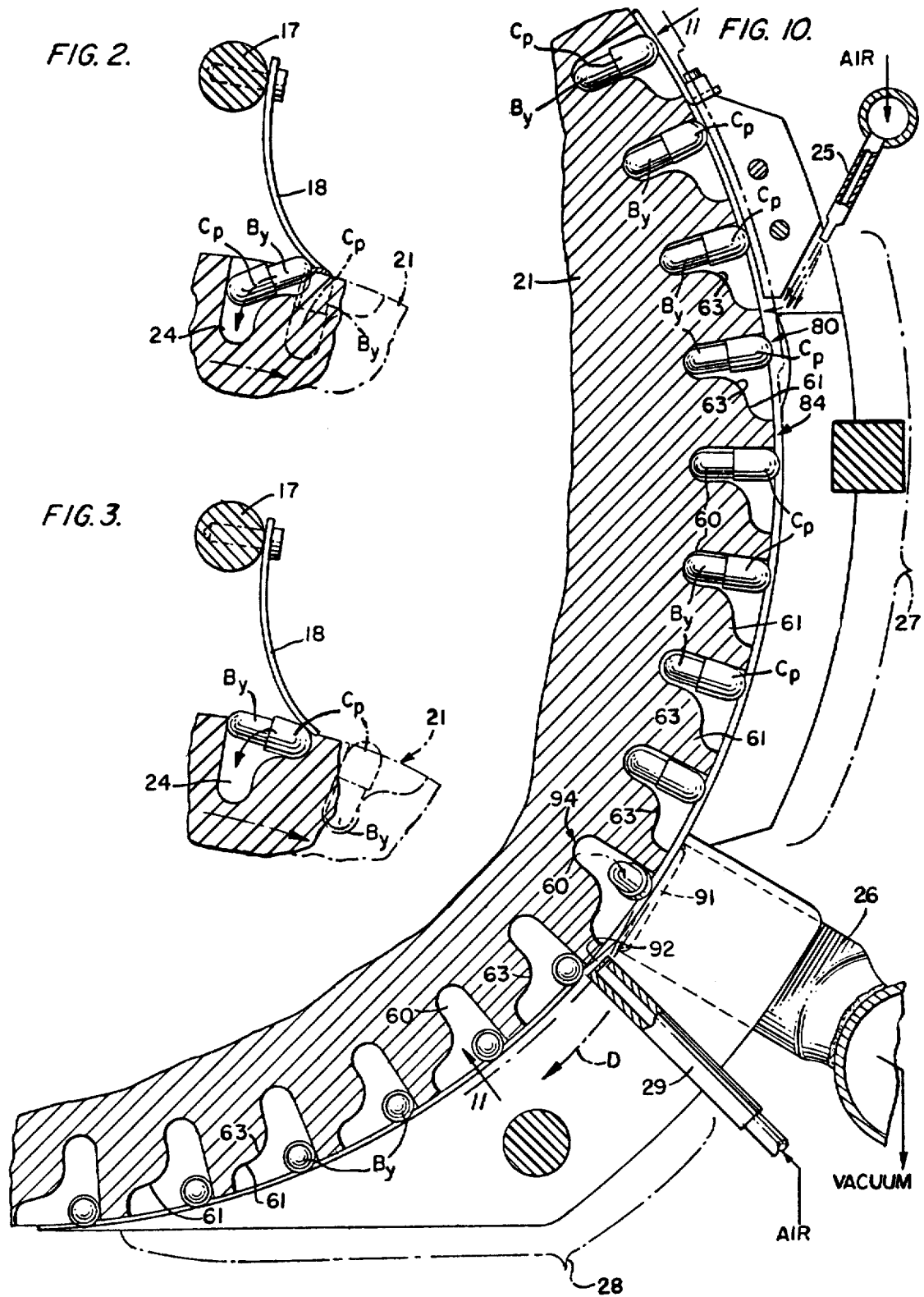

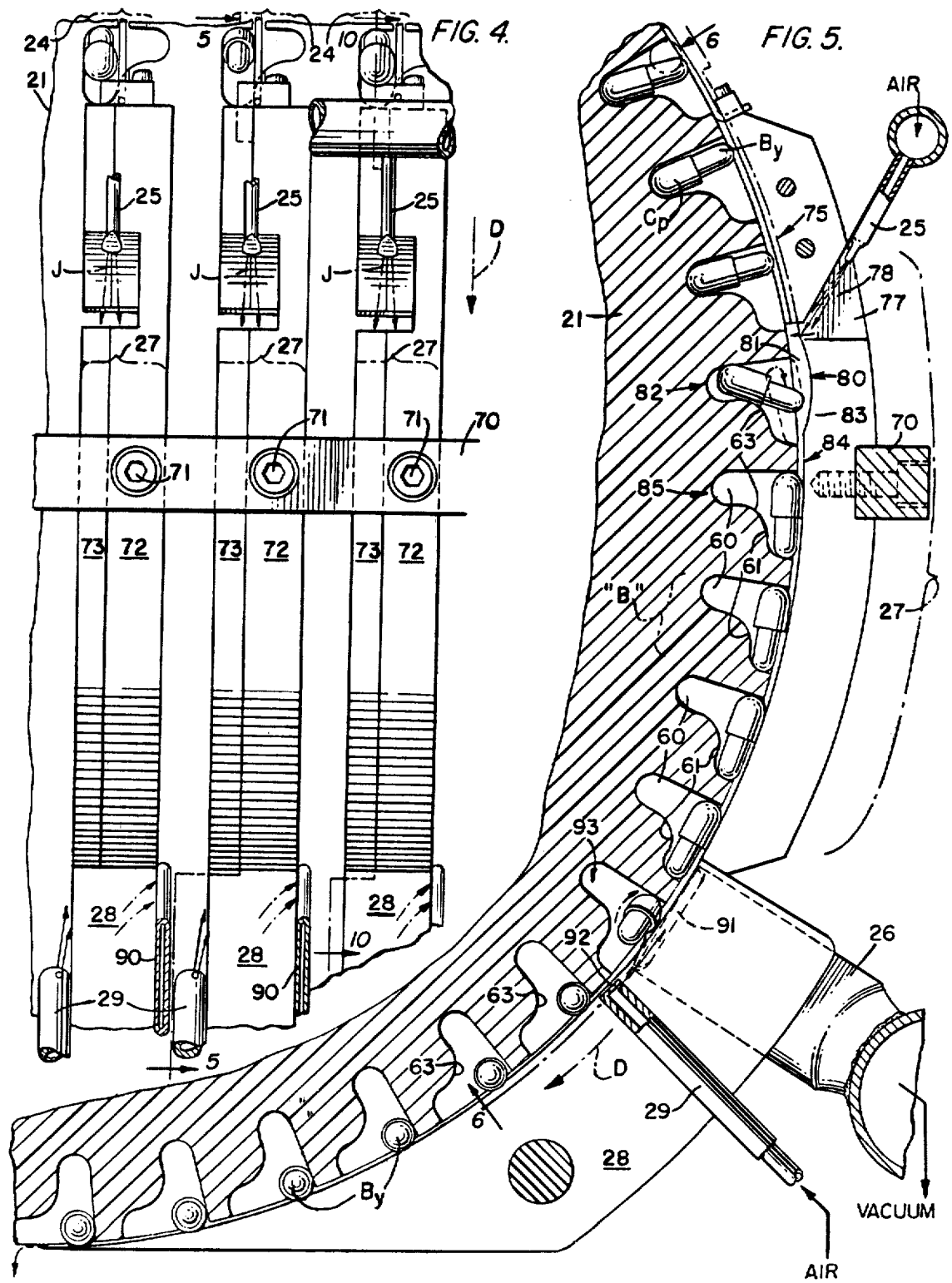

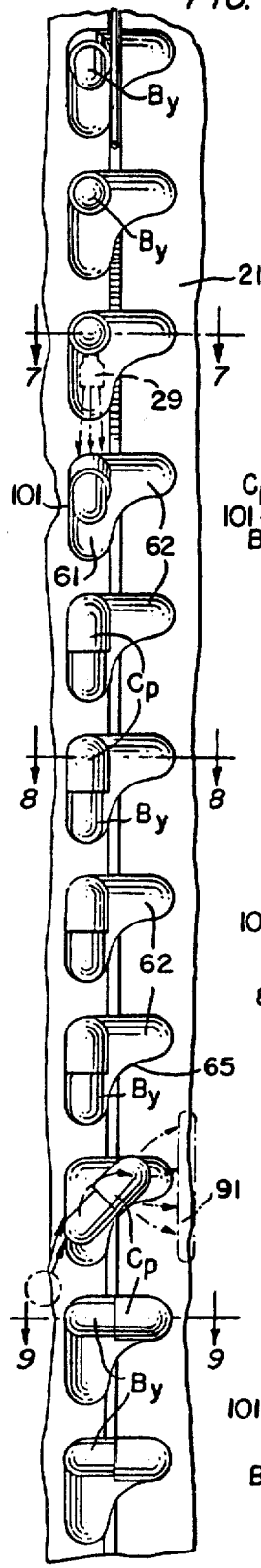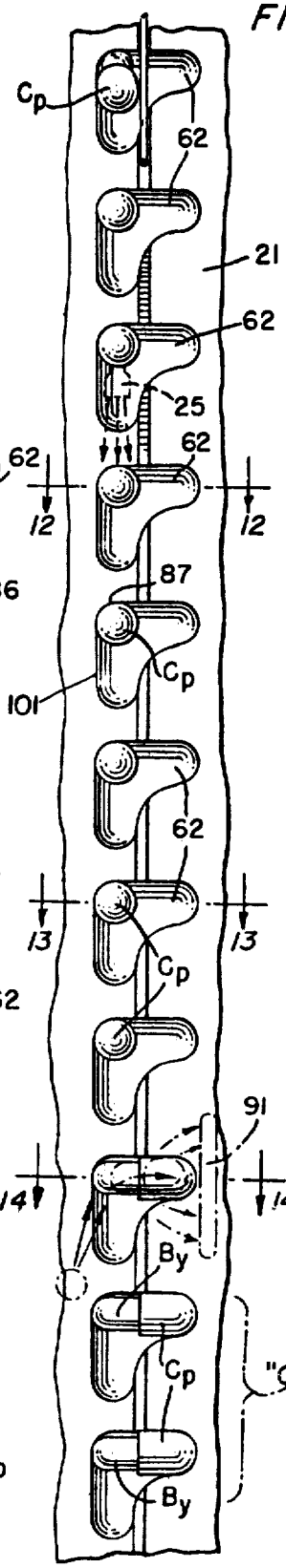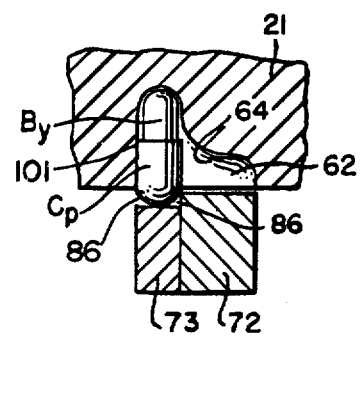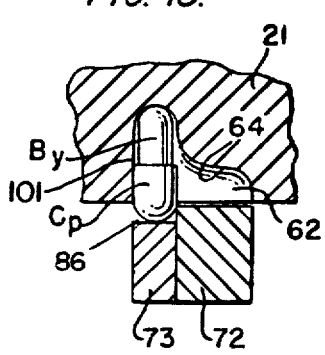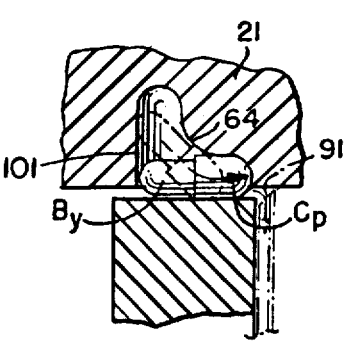

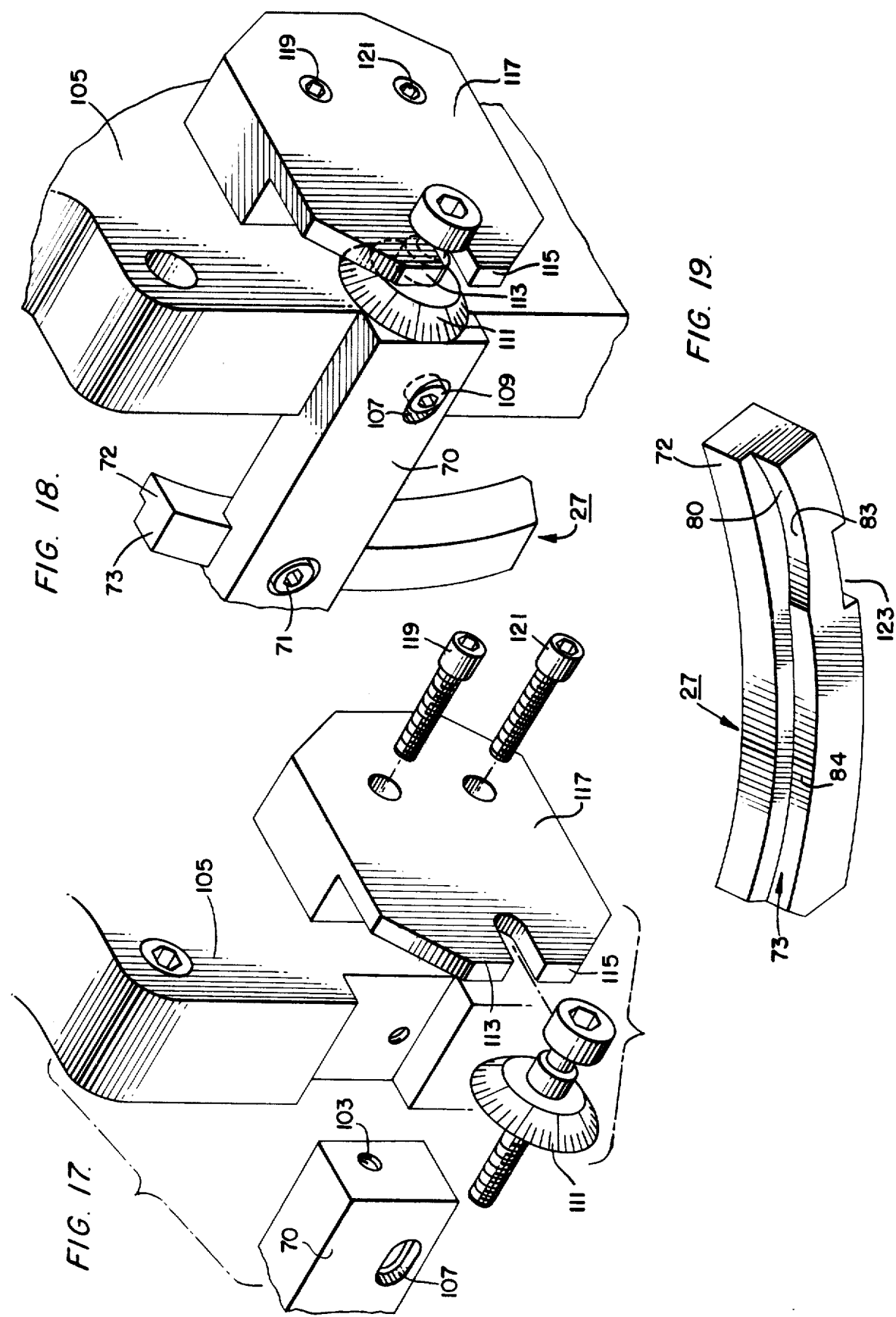

GAUGING ASSEMBLY FOR CAPSULE ORIENTING AND TURNING APPARATUS

INTRODUCTION

This invention relates to an improved gauging assembly for use in conjunction with capsule orienting and turning devices such as those disclosed in U.S. Pat. No. 4,104,966 (Ackley et al), the disclosure of which is hereby incorporated by reference.

BACKGROUND OF THE INVENTION

Marking machines of various types have been used commercially for marking indicia on a multiplicity of objects all of which have essentially the same size and shape. For example, machines have been successfully used for applying to relatively small articles such as pharmaceutical capsules, pellets, pills and the like, markings such as alphabetical letters, manufacturer's trademarks or other characterizing symbols for the purpose of ready identification. However, in most commercial procedures, particularly in the pharmaceutical industry, one of the primary objects of marking has been to prevent counterfeiting of products and of materials contained therein. In order to achieve this purpose, it has been highly desirable to apply an extremely accurate marking, having such a finely detailed character that counterfeiting is difficult or virtually impossible.

In certain of the machines now utilized commercially, the capsules are all first oriented in predetermined fashion with the cap portions of the capsules facing a given direction, and the bodies facing the opposite direction. In this manner, as the oriented capsules are passed beneath the print imparting rolls of a suitable printing mechanism, they can be uniformly printed in desired manner, e.g., such as on the capsule cap portion or on the body portion. Devices of this general type, in which orientation of the capsules is achieved, are commonly referred to as rectification machines.

DISCUSSION OF THE PRIOR ART

The Ackley U.S. Pat. No. 2,931,292 discloses an article marking machine wherein the individual objects to be printed upon are randomly arranged in a hopper, moved along a conveyor belt, and printed with extreme fineness and accuracy on one or both sides of the objects while holding the objects completely stationary in carriers which are specifically designed for the purpose.

U.S. Pat. No. to Ackley 3,871,295 discloses a capsule orienting and turning apparatus and method of the type which is capable of accepting a multiplicity of capsules arranged at random in a hopper, and tilting and orienting the capsules so that they are rectified. This Ackley patent includes a positive flow of air which first tilts the bodies-up capsules in the machine direction, and a cross-wise air flow which subsequently swings all the cap portions of all of the capsules in a sideward direction with respect to the direction of their movement. Those capsules which were initially positioned with the caps up are not tilted in the machine direction by the first current, because they are prevented from doing so by critically spaced stop means positioned immediately adjacent to their path of movement at the point where the air pressure is applied.

It has been found that in the use of a machine having pockets for a plurality of adjacent rows of capsules, problems arise in the operation of machines and methods of the prior art. The unrestricted flow of air, producing air currents and eddy currents, which flow to neighboring capsule rows on one side or even to both sides, tends to interfere with the reliability of operation in the adjacent or neighboring rows of capsules, thus producing malfunctions from place to place. A gauging block is highly instrumental in establishing and maintaining a particularly high degree of reliability in the initial capsule handling functions of the apparatus. The apparatus as disclosed in U.S. Pat. No. 4,104,966 (Ackley et al) utilizes such gauging structure.

Although the device disclosed in the aforementioned —966 (Ackley et al) patent has proved tremendously successful in the efficient and high-speed rectification and printing of capsules, the gauging structure thereof must be removed and replaced with differently dimensioned gauging structure when capsules of different size are to be processed. Replacement of existing gauging structure with altogether new or remachined gauging structure is not only expensive, but results in considerable machine "down time" and resulting production inefficiencies.

OBJECTS OF THE INVENTION

It is accordingly an object of this invention to provide an improved automatic machine which can accept for mass production large numbers of capsules which are arranged completely at random in a container such as a feed hopper for example, and which can sort out and orient the capsules with the aid of a gauging block assembly so that the capsules are spaced apart uniformly from each other and so that they can be "rectified" or "oriented", both of which terms as used in connection with this invention means arranging all of the cap portions toward one side of the predetermined path of movement of the capsules, and arranged all of the body portions toward the other side of such path.

It is a specific object of this invention to provide an apparatus of the general type disclosed in the —966 (Ackley et al) patent, but wherein the gauging structure therein is significantly improved by the provision of a mechanism which automatically adjusts the width dimension of the gauging passageway so that capsules of different size may be processed thereon, without undue delay and/or the replacement or reconstruction of the existing gauging assembly.

Other objects and advantages of this invention, including the simplicity and economy of the same, and the ease with which it may be adapted to the high speed mass production of wrap-around printed capsules, will readily become apparent hereinafter and in the drawings.

DRAWINGS

Of the drawings:

FIG. 2 is an enlarged fragmentary view of a portion of the apparatus of FIG. 1, as encompassed within the arrowed circle 2 which appears in FIG. 1;

FIG. 3 is a view similar to FIG. 2, showing a subsequent step in the operation of this portion of the apparatus;

FIG. 4 is a fragmentary elevational view taken as indicated by the lines and arrows 4—4 which appear in FIG. 1;

FIG. 5 is a sectional view taken as indicated by the lines and arrows 5—5 which appear in FIG. 4;

Figures 1, 1A:
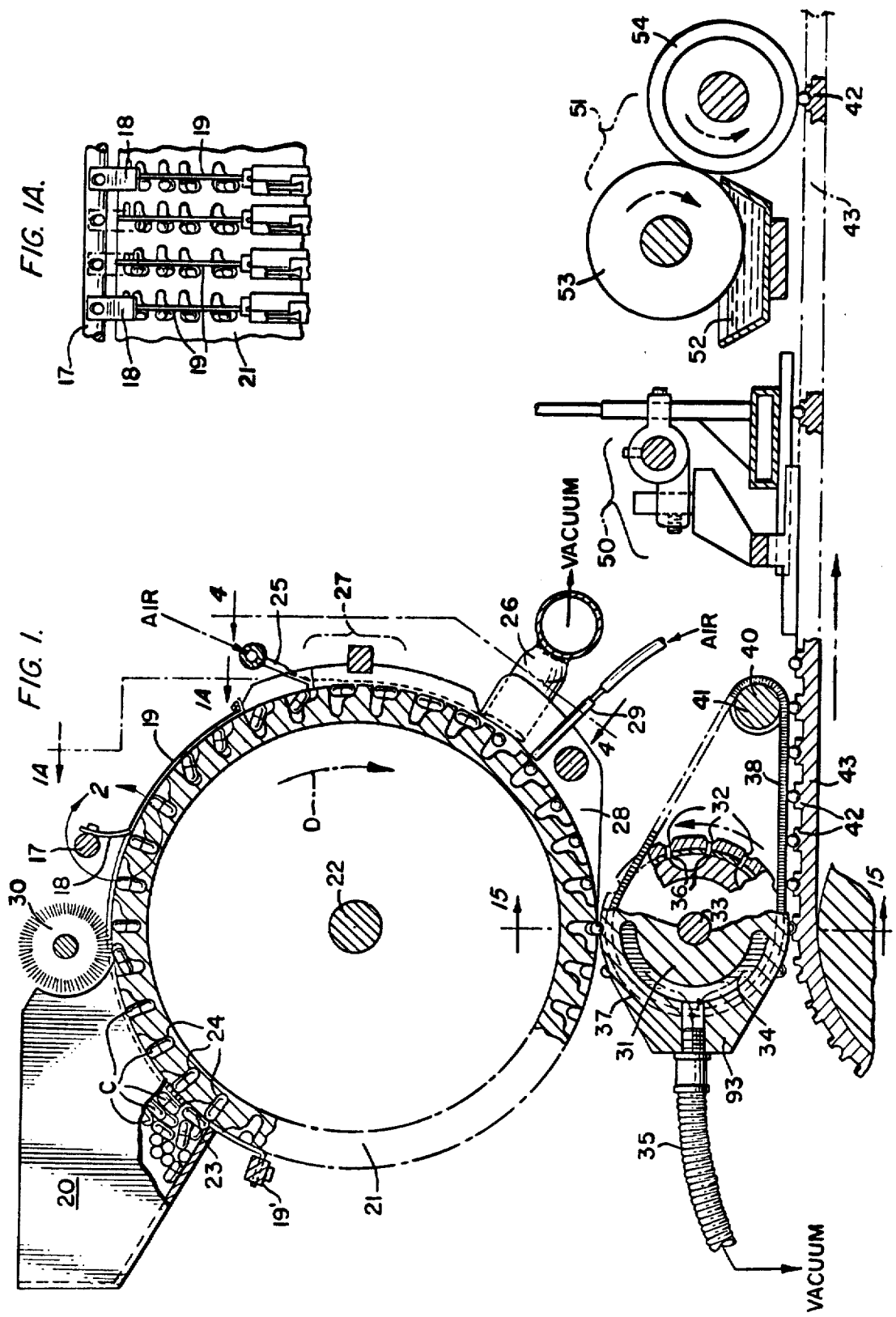
FIG. 1 is a vertical transverse sectional view taken through a machine embodying features of this invention.
FIG. 1A is a fragmentary face view of a portion of the cylinder appearing in FIG. 1.
Figure 15:
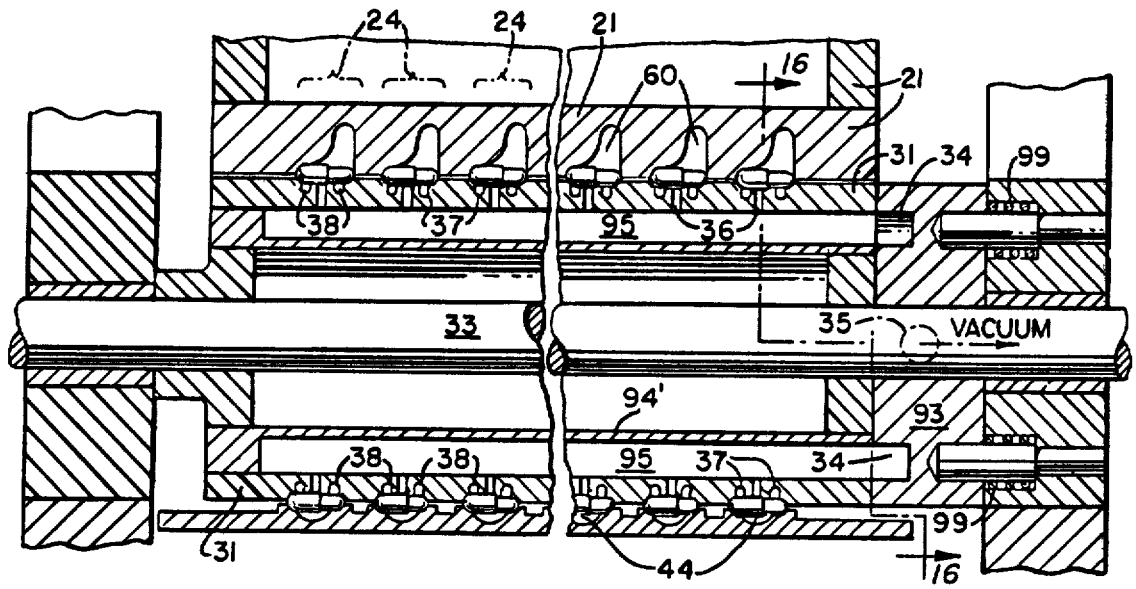
Figure 16:
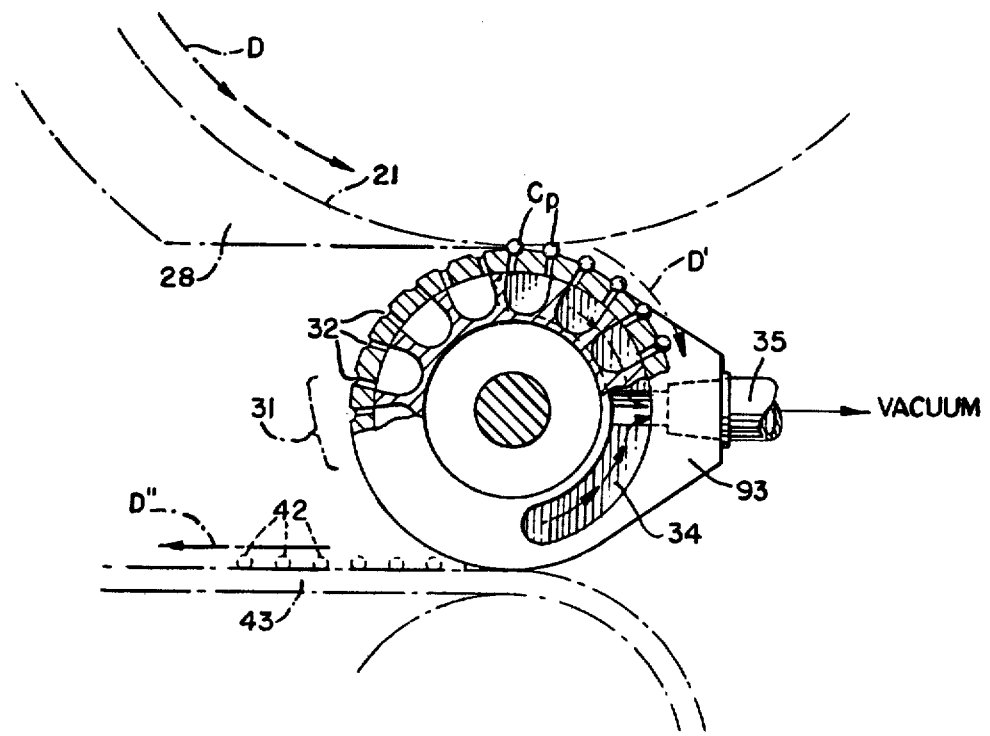

FIG. 6 is a surface arcuate view taken along the surface of the cylinder appearing in FIG. 5, and taken as indicated by the lines and arrows 6—6 which appear in FIG. 5. In FIG. 6 the drawing shows successive pockets selected for illustration of the sequence of events that occurs in the operation of the apparatus, in conjunction with a capsule which is presented with the capsule body portion in its "up" position;

FIGS. 7, 8 and 9 are sectional views taken as indicated by the lines and arrows 7—7, 8—8 and 9—9, respectively;

FIG. 10 is a sectional view taken as indicated by the lines and arrows 10—10 which appear in FIG. 4, and illustrating successive positions of capsules which are assumed to have been presented initially with the capsule cap portion "up", in order to illustrate the successive operations which are performed on a capsule which is initially so presented;

FIG. 11 is a sectional view taken as indicated by the lines and arrows 11—11 which appear in FIG. 10. Again, in FIG. 11, successive pocket positions are shown in order to illustrate operations which occur upon a capsule which is initially presented with the cap portion in its "up" position;

FIGS. 12, 13 and 14 are sectional views taken as indicated by the lines and arrows 12—12, 13—13 and 14—14, respectively;

FIG. 15 is a vertical transverse cross-sectional view through a vacuum transfer roller which comprises one component of the apparatus appearing in FIG. 1, and is taken as indicated by the lines and arrows 15—15 which appear in FIG. 1;

FIG. 16 is a fragmentary sectional view taken as indicated by the lines and arrows 16—16 which appear in FIG. 15;

FIG. 17 is an exploded perspective view of a preferred embodiment of the mechanism for automatically adjusting the width dimension of the gauging passageway in accordance with the invention;

FIG. 18 is a perspective view of the gauging passageway width adjustment mechanism shown in FIG. 17; and FIG. 19 is a perspective view of a gauging block in accordance with the invention.

In the specification which follows, specific terms will be used for the sake of clarity, and as descriptions of the specific forms of the invention which have been selected for illustration in the drawings. However, the use of such specific terms, and the use of such specific embodiments in the drawings, is not intended to imply any limitations with respect to the scope of the invention which is defined in the claims.

Turning to FIG. 1, the number 20 designates a capsule carrying hopper which is mounted on a suitable support (not shown), above a portion of a rotatable cylinder 21 which is mounted for rotation about an axle 22. A motor (not shown) is provided for rotating the cylinder 21. The hopper 20 has an opening as indicated at 23 for delivery of capsules to a plurality of equally spaced, generally elongated cavities 24 which are formed in and extend in rows across the outer surface of the rotatable cylinder 21. It will be observed that the capsule cavities have elongated portions which extend in a generally radial direction, as will be described in more specific detail hereinafter, allowing the capsule to be received by the cylinder 21 in generally radial positions. As will become apparent in further detail hereinafter, some of the capsules naturally fall into the cavities 24 in an upright position, with the body portions above the cap portions, while other capsules fall naturally into the cavities 24 in an inverted position, with the cap portions above the body portions.

Turning to the uppermost portion of the cylinder 21, the number 30 designates a rotating brush which serves to straighten out any capsules that may be lying in an angular position, as opposed to the upright position illustrated in FIG. 1. Just downstream of the brush 30 (in the direction D) is a further device, as shown within the circled arrow 2, which further serves to position the capsules in an upright position within their pockets 24.

As shown in FIG. 1, and in particular detail in FIGS. 2 and 3, a cross-bar 17 is provided, carrying a plurality of flexible plastic strips 18, the lower tip ends of which are free, and which are arranged to contact the surface of the cylinder 21. It will be appreciated in FIGS. 2 and 3 that with either the cap portion C in its up position, or the body portion B in its up position, the plastic strip 18 contacts the capsule and urges it in the direction indicated by the curved arrows appearing in FIGS. 2 and 3, into upright positions within the pockets 24.

Means are provided for urging the capsules in a sideward direction, in order to maintain them in an upright position, and to prevent them from tilting sidewardly as they are fed in the upper portion of the cylinder 21. Such means appear in particular detail in FIG. 1A. It will be observed in FIG. 1A that the cavities 24 are arranged in rows extending longitudinally in the machine direction, and also that a plurality of separate, spaced-apart, substantially parallel rows are provided. Extending along each such row is a groove in which is positioned an elongated guide wire 19. The guide wires 19 are parallel to each other, and are positioned in a manner to restrain sidewardly directed tilting movement of the upper portions of the capsules. The guide wires 19 pass around approximately ⅛ of the upper portion of the cylinder 21, as shown in FIG. 1 and are attached to a bar 19' located upstream of the hopper 20. (In this specification the expressions "upstream" and "downstream" are used with reference to the machine direction D appearing in FIG. 1). Accordingly, the wires 19 extend completely underneath the hopper 20, underneath the brush 30, underneath and to one side of the individual fingers 18, and have a downstream termination at the upstream portion of the gauging blocks 27, which will be described in further detail hereinafter.

The number 25 designates a plurality of longitudinally directed air jets which are arranged to provide blasts of air in a direction generally along the direction D in which the rotatable cylinder 21 is rotating. The number 26 designates vacuum ducts having elongated openings, which are arranged to draw air substantially crosswise of the machine, and which effectively draw certain capsules in a crosswise direction, as appears in FIG. 1, and as will be described in further detail hereinafter.

The number 27 designates a novel gauging block, the details of which will be described in further particularity hereinafter. The gauging block 27 serves to prevent substantial tilting movement, in the direction D, of those capsules which are arranged caps-up in their pockets 24, but to permit such movement of those capsules which are arranged bodies-up, under the influence of air from the jets 25. Gauging block 27 also assures that those capsules which have tilted to a substantially tangential arrangement will be retained in such condition as they continue to move downwardly in the direction D.

The number 28 designates a guide block for the capsules. It is shown as carrying an air inlet 29 for secondary air, which coacts with the vacuum ducts 26 as will be further described. Guide block 28 retains all capsules in position within their pockets, at the lower portion of the cylinder 21, as the capsules continue to move in the direction D.

Located directly beneath the cylinder 21 is a transfer cylinder 31 having a plurality of pockets 32, and an axle 33 about which the transfer cylinder 31 rotates. The pockets 32 are shaped, spaced and arranged to receive capsules transferred from the pockets of cylinder 21. This transfer is assisted by a stationary vacuum shoe 34 which, as shown, extends approximately 180° around the periphery of the transfer cylinder 31. A vacuum connection 35 is provided for the purpose of drawing vacuum upon the capsules in the pockets 32, by way of openings 36 at the bottoms of the pockets 32. The transfer cylinder 32 is provided with at least a pair of grooves 37, spaced axially from each other, and located adjacent each of the ends of the transfer cylinder 31. A pair of extensible flexible members, shown as chain 38 in FIG. 1, are positioned in each of these grooves and stretched around an idler shaft 41. The chains 38 are positioned in a manner to pry the capsules C out of the pockets 32 at the bottom of their path of movement on the transfer cylinder 31, so that they move downwardly onto corresponding pockets 42 in a conveyor 43. The chain 38 is preferably an electrically conducting, extensible chain, which can be stretched around the idler shaft 41, and which is grounded to the idler shaft 41 and/or to the transfer cylinder 31, in a manner to discharge static electricity.

The number 50 designates an optional blasting means for separating the cap and the body portion to a limited degree in order to provide an exact overall length for each capsule, preparatory to the spin printing operation. This air separator is the subject of a separate U.S. Pat. No. 3,868,900, and is not itself a part of the invention claimed herein. The number 51 generically designates an offset printing apparatus which is ideally adapted for wrap-around printing in accordance with this invention. It includes an ink reservoir 52, a transfer roll 53, and a printing roll 54 which is continuously rotated in the direction indicated by the arrow thereon, in contact with the capsules as they move underneath the roll 54, carried by their carriers 42 on the conveyor 43. In the spin printing process, one or more elongated forms of indicia are preferably printed on the outer surface of the capsule by adjusting the speed of rotation of the roll 54 so that its surface speed is considerably greater than the speed of movement of the conveyor 43. Preferably capsule carrier 42 is composed of a slippery material such as polytetrafluoroethylene for example, which has a coefficient of friction which is less than that of the printing roll, thus permitting the capsule to rotate freely upon its axis under the frictional influence of the printing roll 54 during the spin printing process.

It will be appreciated that the capsule orienting apparatus of this invention is useful independently of the devices 50 and/or 51, and that the capsule orienting features of this invention may be used for purposes other than spin printing. For example, in view of the ever present possibility of imperfections occurring during the manufacture of the caps or bodies of the capsules, or of the assembled capsules, and in view of the danger of breakage or damage to the capsules in handling or in delivery, it is important to provide a capsule inspection station prior to the time that the capsules are filled with the drug or other substance which they are intended to contain. For the purpose of automatic capsule inspection, utilizing one or a plurality of production line capsule scanning devices or the like, it is important and advantageous to conduct the capsules at high speed along a conveyor in an oriented condition, with all of the cap portions arranged toward one side of the conveyor and with all of the body portions arranged toward the opposite side of the conveyor. Other capsule handling operations are also facilitated by providing the capsules in the oriented condition referred to herein.

Referring now to FIGS. 5, 6, 10 and 11 of the drawings, it will be apparent that each capsule cavity 24 includes a generally radially directed pocket portion 60, a generally longitudinally directed portion 61 and a generally transversely directed portion 62. The pocket portion 60 is connected, by walls having a surface curvature shown at 63, to the longitudinal portion 61, and by walls having surface curvature 64 to transverse portion 62. Another wall having a curved surface portion 65 provides a connection from longitudinal pocket portion 61 to transverse pocket portion 62.

A typical capsule is shown in FIG. 5 in its upright position, in which the body portion B is located above the cap portion C. FIG. 5 has been specially prepared to show the sequence of operations that are applied to a capsule which is initially retained in its pocket in a body-up position. It will be understood, in the normal operation of the apparatus, each capsule is introduced into each body portion completely at random, with some of the capsules in a bodies-up position and with others of the capsules randomly arranged in caps-up positions. However, the capsules have been illustrated in FIG. 5 as though all of them had initially been presented in a bodies-up position, in order more clearly to illustrate the manipulated steps that are applied to the capsules.

It will be appreciated that the longitudinally directed air jets 25 in FIG. 5 impinge upon the body portions $B_y$ in the manner shown therein, and tilt them about the curved surface 63 to the position illustrated as position B in FIG. 5, in which the capsules are arranged with their axes in substantially the machine direction. It will further be appreciated from FIGS. 5-9 that the transverse vacuum means 26 draws upon the cap portions $C_p$ and slides them around the curved portions 65, moving the capsules into the positions illustrated as position "C" in the drawings.

Turning now to FIGS. 10-14 of the drawings, each capsule is there shown as though initially in its inverted position, with each cap $C_p$ above the body portion $B_y$. The longitudinally directed air jet 25 impinges upon the cap portion $C_p$ as shown in FIG. 10, but the cap portion $C_p$ is prevented from swinging into position "B" by the novel gauging block 27, details of which will appear further hereinafter. The width of the gauging block channel is set at a predetermined distance greater than the diameter of capsule body portion $B_y$ but less than the diameter of capsule cap portion $C_p$. Subsequently, the transversely directed vacuum means 26 swings each capsule around the curved surface 64 which appears in FIG. 14 moving the cap portion toward the same side of the machine as the cap portions of the capsules that were originally in their upright positions. Thus, in this manner, all of the capsules are "oriented" which, in accordance with this invention, means that all caps of the capsules are arranged toward one side with respect to the machine direction and all of the body portions of the capsules are arranged toward the other side with respect to the machine direction.

It will now be apparent that, with all of the capsules thus oriented, they move downwardly around the periphery of the rotatable cylinder 21 maintained within their pockets in an oriented condition by the guide block 28, and are deposited under the influence of gravity onto the carriers 32 of the transfer roll 31. They are subsequently deposited on carriers 42 of conveyor 43 and are subjected to printing of a wrap-around type, the printing rolls 54 being driven at a greater peripheral velocity than the velocity of movement of the conveyor 43 and the carriers 42 being recessed at 44 (FIG. 15) to avoid smearing of the printed indicia.

In accordance with this invention a novel gauging block means, comprehensively identified by the number 27, is provided adjacent to the cylinder, as shown in FIG. 1. Turning more particularly to FIGS. 4 and 5 of the drawings, structural details of the gauging block means 27 will further become apparent. It will be appreciated from an examination of FIGS. 1A and 4 that the cylinder 21 contains a multiplicity of rows of the pockets or carriers 24, and that each such row has a multiplicity of pockets spaced apart from one another along the machine direction, and that the pockets of each row are moving parallel to each other in the direction D. As shown in FIG. 4, each row of pockets 24 is provided with an individual air jet 25, each blasting an individual jet of air J upon the capsules contained within the carrier 24 of that row. It is important in accordance with this invention that a plurality of gauging blocks 27 are also provided, each gauging block being specifically arranged adjacent to each such row of capsule carrying pockets 24. As shown in FIG. 4 a cross strap 70 is provided, having spaced bolts 71, securing each individual gauging block 27 in position immediately adjacent to its corresponding row of capsule carriers 24.

As shown in FIG. 4, each gauging block 27 comprises two individual metal strips 72 and 73. These are tightly held together and are immovable with respect to each other. It is preferable that the gauging block 27 be an integral structure.

As is shown in FIG. 5, gauging block strip 72 has a generally arcuate configuration and extends down from the cross strap 70 to a location substantially immediately adjacent to the outer periphery of the rotatable cylinder 21, as indicated by the lowermost surface 75 of gauging block strip 72. By way of contrast, the inner surface 76 of gauging block strip 73 has a cut-out portion indicated by the number 77 forming an air entrance 78 shielded by the gauging block strip 72. Thus, air emanating from the air jet 25 isolated with respect to the particular row of pockets 24, by the presence of an outer gauging block strip wall 72. The innermost surface 80 of middle gauging block strip 73 is spaced apart from the outer periphery of rotatable cylinder 21 and is curved to provide a space 81 allowing for the tilting movement of those capsules which are arranged with the body portions up. Such tilting movement appears at 82 in FIG. 5. The aforementioned innermost surface 80 of middle gauging block strip 73 has a first curved portion 83 and has a further curved surface 84 which is spaced closely to the outer periphery of rotatable cylinder 21. The curved surface 83 cooperates with the surface 84 to confine each capsule during its tilting movement as illustrated at 82 in FIG. 5 and to confine such capsule after the tilting movement has been completed, as indicated at 85 in FIG. 5.

Further referring to FIG. 5, it will be observed that the cut-out portion 77 provides a substantially radially extending wall against which the air from the conduit 25 is projected. The angular relationship of the wall 77 provides an air flow component as indicated by the substantially radially directed arrow in FIG. 5, which applies a portion of the air directly downwardly into the pocket portions 60. This agitates each capsule within its pocket portion and facilitates the tilting movement heretofore described.

It will accordingly be further appreciated that the inner wall of the outer gauging block strip 72 cooperates with the middle gauging block strip 73 and edge portion 101 of longitudinal pocket portion 61 (FIG. 6) to form a channel extending longitudinally along the row of carriers 24, such channel appearing at 86 in FIGS. 7, 8, 12 and 13, isolating the flow of air from neighboring rows. This is an important and advantageous feature of this invention, because the capsules which are carried in the pockets 24 are very light in weight, and are easily affected by air flow of air currents. By shielding each row of pockets from rows adjacent thereto to isolate the air flow to a longitudinal direction in each particular row, and by preventing stray currents or eddy currents from developing which might affect the capsules in neighboring rows, precision operation is achieved.

The rows of pockets are also shielded from each other at the transverse vacuum means 26 by intervening guide blocks 28 to prevent any currents from being transmitted from one row to rows adjacent thereto.

It will be apparent, from a close examination of FIGS. 7 to 9 and FIGS. 12 to 14, that the width of the gauging block passageway defined by distance between edge 101 of pocket 61 and the interior edge of gauging strip 73, is critically important. As shown in FIGS. 7 and 8, the width of the gauging block passageway 86 is slightly wider than the diameter of the body portion $B_y$ of the capsule, thus permitting the forward tilting movement of the capsule as shown in FIG. 7. Such forward tilting movement also appears in FIG. 5, at positions 82 and 85. By way of contrast, referring particularly to FIGS. 12 and 13, this width dimension of the gauging block passageway 86 is slightly less than the diameter of the cap portion C of the capsule, as shown in FIG. 12. Thus, the cap portion $C_p$ in FIG. 12 is gripped or pinched between sidewall gauging strip 72 and edge portion 101 of longitudinal pocket portion 61. This pinching or gripping movement prevents any forward tilting of the cap portion $C_p$ under the influence of the air jet 25. The rear wall portion 87 of the radially directed pocket portions 60 drives the cap portion $C_p$ through the channel 86 (see FIGS. 11, 12 and 13) against the resistance created by the restricted width of the channel 86. Accordingly, the cap portion $C_p$ is shown in the same position in FIG. 13 as it is in FIG. 12.

In accordance with this invention, a vacuum means is provided for swinging the cap ends of the capsules all in the same direction, and leaving the body portions of the capsules extending in the opposite direction. This novel means includes the vacuum means 26 and the guide block 28 associated therewith, including further parts and structural details as will now be described with particularity. In lieu of the vacuum means herein shown, it may be desirable to substitute therefor a pivotal vacuum manifold and associated capsule guide means of the type shown in application Ser. No. 905,742, filed May 15, 1978, now U.S. Pat. No. 4,231,462 of common assignment herewith.

With particular reference to FIGS. 4, 5 and 10, it will be apparent that those capsules which were originally arranged with the body portions up as shown in FIG. 5, have all tilted and are shown arranged in the longitudinal pocket portion 61, in that figure, after passing through the gauging blocks 27. It will further be appreciated that in FIG. 10 the capsules which have been initially arranged with their cap portions up, in the radially directed pocket portion 60, have not been tilted and have been driven through the restricted channel 86 by the driving force of the rear wall 87 of the radially directed pocket portion 60, and continue in an upright position in the radially directed pocket portion 60 at the time of exiting from the gauging block 27.

As is shown in FIGS. 4, 5 and 10, the vacuum source 26 is connected to a plurality of hollow, flat vacuum plates 90 each having an elongated slit opening 91 at its end. The plates 90 are conveniently supported upon the guide block 28 which is suitably secured to the frame of the machine or to any other suitable stationary support. It will be apparent in FIG. 4 that the guide blocks 28 are spaced apart from each other, with each guide block in a position corresponding to each longitudinal row of carriers 24 as they move in the machine direction. It will further be appreciated that each vacuum plate 90 is positioned at one side of the corresponding guide block 28, and that a source of secondary air such as an air pipe 29 is provided on the opposite side of the same individual guide block 28. It will be apparent in FIG. 5 and in FIG. 10 that the pipe 29 has an opening 29 which extends in an upstream durection as indicated by the arrow in FIG. 5, admitting secondary air in the area immediately adjacent to the peripheral surface of rotatable cylinder 21. Further, it will be appreciated that the guide block 28 has an inner surface which is spaced closely to the outer periphery of the rotatable cylinder 21, providing an air gap between them, through which air may flow sidewise across the row of carriers 24. Similarly, it will be appreciated that the slit 90 in the flat vacuum plate 90, for each row, is located across the row in a position opposite to the opening 92, thus providing for a flow of air to be drawn by the vacuum, crosswise across the row 24, as indicated by the arrows appearing in FIG. 4. It will be apparent that this crosswise flow of air induces the longitudinally-positioned capsules of FIG. 5 to shift to a transverse position, as indicated by the arrow at capsule position 93 in FIG. 5. As shown in FIG. 5, all capsule positions subsequent to the vacuum slit 91, in the machine direction D, are transversely arranged with the cap portions $C_p$ toward one side and with the body portions $B_y$ on the other side.

Similarly, with reference to FIG. 10, the capsules with the cap portions $C_p$ upwardly arranged in the radially directed pocket portions 60, are also affected by the vacuum which is drawn in the manner heretofore described, drawing the cap portions toward the same side, as illustrated at position 94 in FIG. 10 of the drawings. It will further be appreciated that all of the capsules are arranged with the body portions in the same direction, at all locations in the downstream direction as indicated by the arrow D downstream of the vacuum slit 91.

It is important to observe in accordance with this invention that the operation of the vacuum, drawn as heretofore described, is substantially isolated with respect to each of the rows of capsule carriers 24. This is effected by the presence of the intervening guide block strips 73, 72 which minimize currents from being transmitted from one row to its adjacent or neighboring rows. This is important and advantageous, because of the fact that the capsules are very light in weight and are very susceptible to mis-direction under the influence of stray currents, or eddy currents.

The combination of drawing a vacuum through the slit 91, together with the secondary air which is directed in an upstream manner through the opening 92, is important and advantageous. The secondary air stream 92 agitates each individual capsule within its pocket, providing it in substantially a state of suspension in which it is readily susceptible to the influence of the air which is drawn crosswise of the machine direction, by the vacuum slits 91.

The operation of the vacuum slits 91 appears in further detail in FIGS. 9 and 14 of the drawings. In FIG. 9, it is clearly shown that the capsules in which the body portions were initially in upward position are now being drawn around the curved surface extending between the longitudinal pocket portion and the transverse pocket portion, in the manner indicated by the arrows at the lower portion of FIG. 6. Similarly, in FIG. 14, the capsules are shown in the same position, with the cap portions $C_p$ extending in the same direction as the cap portions $C_p$ in FIG. 9, having been swung from the substantially radially directed pocket portion into the transversely directed pocket portion of each carrier, all as shown in the lower portion of FIG. 11.

Another important and advantageous mechanism in accordance with this invention appears particularly in FIGS. 1, 15 and 16 of the drawings. As will be apparent, the capsules discharged from the bottom of the cylinder 21, as shown in FIG. 1, are deposited into transversely arranged capsule carrying pockets 32 which are maintained on the surface of the transfer cylinder 31. As appears in detail in FIGS. 15 and 16, this transfer is effected by a vacuum applied through the vacuum line 35, which is connected into a vacuum shoe 93 having a semi-circular vacuum passage 34. The shoe 93 and the passage 34 are maintained stationary, as shown in FIG. 15. The passage 34 in the vacuum shoe 93 is open toward the cylinder 31, and shoe 93 is urged immediately adjacent to the end of cylinder 31 by springs 99. Cylinder 31 includes an inner cylinder 94' providing a vacuum space 95 communicating with the space 34 as the cylinder 31 rotates through the 180° are where the space 34 is present. Thus, during that arc, a vacuum is exerted upon the capsule pockets 24, through the space 95 and through openings 36 which extend from the spaces 95 to the capsule pocket 32. Accordingly, the vacuum, drawn through the connection 35, is applied to the capsules at the bottom of cylinder 21, and draws those capsules into the corresponding pockets 32. Further, the capsules are maintained in the pockets 32 during the entire 180° path of their travel downwardly to the conveyor 43, in this manner.

As is shown in FIG. 15, a multiplicity of slots 37 are provided in the periphery of the cylinder 31, for a multiplicity of spaced parallel expandable springs 38, 38, two for each row of pockets 24. As appears in FIG. 1, these springs separate from the periphery of the cylinder 31 in a manner to pry the capsules out of their pockets 32, and to deposit them onto corresponding pockets 42 on the conveyor 43. In this manner, the springs 38, 38 (which are spaced apart from each other at a distance less than the total length of the capsule) overcome the adhering effect of static electricity. Further, because of the fact that they are preferably electrically conductive and are connected to ground through the member 40, or through the cylinder 31 itself, or both, the capsules themselves are effectively grounded by reason of their contact with the springs 38, thus facilitating their handling without the disturbing effects of static electricity.

Turning consideration now, to FIGS. 17 and 18, there is shown the novel means for adjusting the width of the gauging passageway 86 (FIGS. 8, 12, 13). As is apparent from FIGS. 8, 12 and 13, the width of the gauging passageway 86 is determined by the distance between edge 101 of longitudinal pocket portion 61 and the interior edge of sidewall gauging strip member 72. One end portion of cross strap 70 is provided with threaded bore 103. The cross strap 70 is slidably fastened to side frame member 105 by means of an elliptically formed slot 107 and nut 109 (FIG. 18). A threaded calibration screw 111 is received in threaded bore 103 and is held between prongs 113, 115 of straddle 117 which is fixed to side frame 105 by bolts 119, 121. Accordingly, it is apparent that rotation of the calibration screw 111 is transmitted into linear, sliding motion of the cross strap 70. As rotatable cylinder 21 is mounted on axle 22, one end of which is journalled in side frame 105 and the other end being journalled in an opposed side frame (not shown) the sliding movement of the cross strap 70, carrying gauging strips 72, 73 allows adjustment of the distance between edge portion 101 of longitudinal pocket portion 61 (FIGS. 8, 12, 13) and the interior edge of sidewall strip member 72 so that the width of the gauging channel may be varied as desired to accommodate different capsule sizes.

FIG. 19 depicts the gauging block 27 per se. Gauging block 27 comprises integrally formed strips 72, 73. As shown, strip 72 forms a side wall of the gauging passageway 86 (FIGS. 8, 12, 13) with the ceiling of the passageway being defined by the inner surface 80 of strip 73 having first curved portion 83 and a second (downstream) curved portion 84. Groove 123 is formed transversely in the rearward portion of the gauging block 27 to accommodate mating of the cross strap 70 and block 27.

It will be appreciated that the arrangement of the apparatus in the manner shown in FIGS. 1 and 16, with the transfer roll interposed between the cylinder 21 and the conveyor 43, provides a particularly compact arrangement wherein the members 50 and 51, together with necessary driving motors and vacuum equipment, may be compactly arranged and positioned with respect to each other. Alternatively or in conjunction with the members 50 and 51, various scanners or other inspection devices may be compactly incorporated into the apparatus, because of the nature of this construction and arrangement.

The efficiency, speed and certainty of operation of the apparatus are greatly enhanced by the novel gauging block structure heretofore described, by the novel sidewardly directed vacuum means 26, by the isolation of individual rows of capsule carrying pockets from each other when under the influence of air or of vacuum, and the shifting effect of the electrically conductive chains 38, all in a manner to provide rapid, efficient and entirely correct sorting and delivery operations, without crushing, damaging or destroying the capsules as they are being handled, and with complete accuracy and correctness of orientation.

Although this invention has been described in conjunction with certain specific forms and certain modifications thereof, it will be appreciated that a wide variety of other modifications can be made without departing from the spirit of the invention. For example, some of the features of the invention may be used independently of other features. Indeed, the capsule orienting and rectifying apparatus is capable of other uses independently of wraparound printing, although it is admirably adapted for that use.

Additionally, in accordance with this invention, various equivalent elements may be substituted for those shown and specifically described, and in many instances parts may be reversed in ways which will become apparent to those skilled in the art, all without departing from the scope and spirit of this invention as defined in the appended claims.

I claim:

1. In an orienting and turning apparatus for capsules having body portions and enlarged cap portions arranged along substantially a common axis, wherein a continuously movable capsule transporting means is provided having a plurality of spaced-apart pockets for the capsules, and said apparatus having a means for feeding a plurality of capsules for reception at random, caps up and caps down in said pockets, each said pocket having an upright pocket portion for receiving said capsules therein with the capsule arranged in a substantially upright attitude relative to the direction of capsule movement, each said pocket also having a longitudinal pocket portion arranged to carry the capsule at an attitude with the capsule axis extending in approximately the transport direction, and each said pocket having a substantially crosswise pocket portion arranged to carry the capsule arranged in a substantially crosswise attitude relative to the direction of its movement and also substantially crosswise of said upright position, wherein a gauging means is provided downstream of said capsule feeding means and is located adjacent the path of movement of said pockets, said gauging means defining an elongated passageway extending in said transport direction, the width of said passageway being greater than the outside diameter of said capsule body portion but lesser than the outside diameter of said capsule cap portion whereby said cap portions are frictionally engaged in said passageway to maintain said caps-up capsules in a caps-up position, tilting means for tilting the caps-down capsules toward the transport direction in said passageway, said upright pocket portions having surfaces arranged to engage caps-up capsules to overcome the frictional resistance of said passageway to force said caps-up capsules along said gauging passageway whle maintaining them in a caps-up attitude, and vacuum turning means downstream of said gauging means for causing all of said cap portions that are in an upright attitude and all of said cap portions which are in an attitude extending in the transport direction to swing to an attitude in a substantially crosswise direction, the improvement comprising:

(a) gauging means width adjustment means for adjusting the width of said passageway to a desired predetermined measurement, and (b) said passageway being defined by a gauging block member having a ceiling wall extending above said pockets and positioned along the transport direction of said conveyor, and a side wall member depending from one side of said ceiling member and extending along said transport direction in contiguous relation to said ceiling member to form one side of said passageway, edge portions of said longitudinal pocket portions defining the other side of said passageway, which edge portions are located adjacent said ceiling wall member and opposite from said side wall member, wherein said gauging means width adjustment means comprises a bar member positioned transversely with respect to said transporting means, said gauging block member being carried by said bar member and wherein sliding means are provided for slidably moving said bar back and forth along a transverse direction with respect to said transport conveyor.

2. Capsule orienting and turning apparatus as defined in claim 1 wherein said sliding means comprise a straddle member, a threaded calibration screw, and a threaded bore formed in one endwise side of said bar member, said straddle member being fixedly mounted alongside said transport conveyor, said calibration screw being received in said straddle and extending into said threaded bore whereby rotation of said calibration screw is translated into sliding movement of said bar.

3. In an orienting and turning apparatus for capsules having body portions and enlarged cap portions arranged along substantially a common axis, wherein a continuously movable capsule transporting means is provided having a plurality of spaced-apart pockets for the capsules, and said apparatus having a means for feeding a plurality of capsules for reception at random, caps-up and caps-down in said pockets, each said pocket having an upright pocket portion for receiving said capsule therein with the capsule arranged in a substantially upright attitude relative to the direction of capsule movement, each said pocket also having a longitudinal pocket portion arranged to carry the capsule at an attitude with the capsule axis extending in approximately the transport direction, and each said pocket having a substantially crosswise pocket portion arranged to carry the capsule arranged in a substantially crosswise attitude relative to the direction of its movement and also substantially crosswise of said upright position, and wherein gauging means are provided downstream of said capsule feeding means and adjacent the path of movement of said pockets, said gauging means defining an elongated passageway extending in said transport direction, the width of said passageway being adjusted to a value greater than the outside diameter of said capsule body portion but lesser than the outside diameter of said capsule cap portion, whereby said cap portions are frictionally engaged in said passageway to maintain said caps-up capsules in a caps-up position, tilting means for tilting the caps-down capsules towards the transport direction in said passageway, said upright pocket portions having surfaces arranged to engage said caps-up capsules to overcome the frictional resistance of said passageway to force said caps-up capsules along the gauging passageway while maintaining them in a caps-up attitude, and vacuum turning means downstream of said gauging means for causing all of said cap portions that are in an upright attitude and all of said cap portions which are in an attitude extending in the transport direction to swing to an attitude in a substantially crosswise direction, the improvement comprising gauging means width adjustment means for adjusting the width of said passageway to a desired predetermined measurement, wherein said gauging means width adjustment means comprise a bar member positioned transversely with respect to said transporting means, a gauging block member defining said passageway and being carried by said bar member and wherein sliding means are provided for slidably moving said bar back and forth along a transverse direction with respect to said transport conveyor.

4. Capsule orienting and turning apparatus as defined in claim 3 wherein said sliding means comprise a straddle member, a threaded calibration screw, and a threaded bore formed in one endwise side of said bar member, said straddle member being fixedly mounted alongside said transport conveyor, said calibration screw being received in said straddle and extending into said threaded bore whereby rotation of said calibration screw is translated into sliding movement of said bar.

5. Capsule orienting and turning apparatus as defined in claim 3 wherein said gauging block member comprises a ceiling wall extending above said pockets and positioned along the transport direction of said conveyor, and a side wall member depending from one side of said ceiling member and extending along said transport direction in contiguous relation to said ceiling member.

6. In an orienting and turning apparatus for capsules having body portions and enlarged cap portions arranged along substantially a common axis, including a continuously movable capsule transporting cylinder having a plurality of spaced-apart pockets for the capsules, and gauging means adjacent the path of movement of said pockets defining along with a lateral edge of said pockets an elongated passageway proximate the curved surface of said transporting cylinder and extending in the circumferential direction therealong, the width of said passageway being adjustable to maintain said caps-up capsules caps-up by contact therewith as said capsules are transported along said passageway by travel in said pockets formed in said cylinder as said cylinder rotates whereby all of said cap portions of said caps-up capsules are brought to an attitude in a substantially common direction, one lateral boundary of said passageway being defined by an adjustably movable gauging member of said gauging means including a ceiling extending above said pockets and positioned along the transport direction of said conveyor, and a wall member of said gauging means depending from said ceiling member radially inwardly towards said transport cylinder curved surface along said transport direction in contiguous relation to said ceiling member to form a side of said passageway, said gauging means wall member forming said passageway side extending along a row of pockets, shielding against flow of stray currents of air from neighboring rows, said gauging means wall member being moveable axially with respect to said transport cylinder to adjust said width of said passageway wherein the center line of said passageway moves in the axial direction with respect to said transport cylinder as said wall member moves to adjust width of said passageway.

7. The apparatus defined in claim 6, wherein said gauging member is formed of separate adjacent portions, and wherein means are provided for adjusting said portions toward and away from each other.

* * * * *